United States Patent
Chene et al.

(10) Patent No.: US 9,401,966 B2
(45) Date of Patent: Jul. 26, 2016

(54) METHODS AND SYSTEM FOR ORCHESTRATING SERVICES AND DATA SHARING ON MOBILE DEVICES

(75) Inventors: Marc Chene, Ottawa (CA); Liam Peyton, Ottawa (CA); Kevin McGuire, Kanata (CA); Brant Drummond, Dunrobin (CA)

(73) Assignee: ProntoForms Corporation, Kanata (CA)

(*) Notice: Subject to any disclaimer, the term of this patent is extended or adjusted under 35 U.S.C. 154(b) by 1287 days.

(21) Appl. No.: 12/522,688

(22) PCT Filed: Jan. 1, 2008

(86) PCT No.: PCT/IB2008/000052
§ 371 (c)(1),
(2), (4) Date: Jul. 9, 2009

(87) PCT Pub. No.: WO2008/084386
PCT Pub. Date: Jul. 17, 2008

(65) Prior Publication Data
US 2010/0049874 A1 Feb. 25, 2010

Related U.S. Application Data
(60) Provisional application No. 60/880,328, filed on Jan. 12, 2007.

(51) Int. Cl.
G06F 15/16 (2006.01)
H04L 29/08 (2006.01)
G06F 17/30 (2006.01)

(52) U.S. Cl.
CPC ...... H04L 67/2823 (2013.01); G06F 17/30569 (2013.01); H04L 67/04 (2013.01); H04L 67/28 (2013.01); H04L 67/1095 (2013.01)

(58) Field of Classification Search
CPC ..... G06F 17/3056; H04L 67/04; H04L 67/28; H04L 37/2823
USPC .......................................................... 709/246
See application file for complete search history.

(56) References Cited

U.S. PATENT DOCUMENTS 6,822,957 B1    11/2004  Schuster et al. ............. 370/389
7,774,504 B2 *  8/2010   Chene ................... G06F 17/243
                                                     705/26.8

(Continued)

FOREIGN PATENT DOCUMENTS

EP       1720375         11/2006    ............... H04B 1/20
WO       WO03/073324      9/2003    ............... G06F 17/30
WO       WO2005/079349    9/2005

OTHER PUBLICATIONS

International Search Report mailed Jul. 7, 2008 which issued in corresponding International Patent Application No. PCT/IB2008/000052 (3 pages).

(Continued)

Primary Examiner — Douglas Blair
(74) Attorney, Agent, or Firm — Nixon Peabody LLP (57) ABSTRACT

A method and system relating to a mobile orchestration platform to facilitate share of data between orchestration endpoints. The orchestration endpoints may include data applications or data services located on a mobile device or remotely from the mobile device. An example platform includes a first endpoint connector associated with a first orchestration endpoint to communicate between the mobile orchestration platform and the first orchestration endpoint. A second endpoint connector associated with the second orchestration endpoint to communicate between the mobile orchestration platform and the second orchestration endpoint is included. A service module to translate a data record in an intermediate data format to either the first data format or the second data format is included.

7 Claims, 6 Drawing Sheets

(56) References Cited

U.S. PATENT DOCUMENTS

| | | | |
|---|---|---|---|
| 2003/0081557 A1* | 5/2003 | Mettala et al. | 370/252 |
| 2004/0131082 A1* | 7/2004 | Evans et al. | 370/469 |
| 2004/0193459 A1* | 9/2004 | Delaney et al. | 705/7 |
| 2006/0023688 A1 | 2/2006 | Kilian | |
| 2006/0036610 A1 | 2/2006 | Wang | 707/10 |
| 2006/0106641 A1* | 5/2006 | Bartsch et al. | 705/2 |
| 2006/0161646 A1* | 7/2006 | Chene | G06F 17/243 709/223 |
| 2006/0195476 A1* | 8/2006 | Nori | G06F 17/30607 |
| 2006/0230030 A1 | 10/2006 | Volpa | 707/3 |
| 2007/0143342 A1* | 6/2007 | VanNostrand | 707/104.1 |
| 2007/0219976 A1* | 9/2007 | Muralidhar | G06F 17/30914 |

OTHER PUBLICATIONS

Written Opinion mailed Jul. 7, 2008 which issued in corresponding International Patent Application No. PCT/IB2008/000052 (5 pages).

Sliver: A BPEL Workflow Process Execution Engine for Mobile Devices Gregory Hackman:, Mart Hairjerna, Christopher GiiL and Gruia-Catalin Roman, dated Jan. 1, 2006, 8 pages.

Generic Framework for Rapid Application Development of Mobile Web Services with Dynamic Workflow Management: Adel Ben Mnaouer, Anand Shekhar and Ahao Yi Liang, Dated Sep. 2004, 8 pages.

Extended European Search Report, EP08701216.6, dated. Nov. 24, 2014, 8 pages.

* cited by examiner

METHODS AND SYSTEM FOR ORCHESTRATING SERVICES AND DATA SHARING ON MOBILE DEVICES

CLAIM OF PRIORITY AND RELATED APPLICATIONS

This application is a U.S. national stage filing of International Application No. PCT/IB2008/000052 filed Jan. 11, 2008 and this application claims priority to the International Application No. PCT/IB2008/000052, filed Jan. 11, 2008 and U.S. Provisional Application No. 60/880,328, filed Jan. 12, 2007 to the same inventors and hereby incorporates by reference those applications in their entirety.

FIELD OF THE INVENTION

The present invention relates generally to mobile device orchestration and, more particularly, to a system and method for orchestrating services and data sharing on mobile devices.

BACKGROUND OF THE INVENTION

Today, most data in field force industries (e.g., field sales, field services, inspection and reporting, etc.) is distributed and captured on paper-based forms. The data entered on paper-based forms are typically returned to the business office to be manually entered electronically and integrated with a back office system. Furthermore, an enterprise business process might require the captured data to be reviewed by other members of the organization (e.g., authorization, up sell opportunity, billing, etc.) before, during, or after the field has interacted with the data. The process of distributing, updating, capturing, and returning form data and adapting it to a unique business process applies to a large number of mobile workers performing a variety of tasks such as, but not limited to, data collection solutions such as inspections (e.g., property, health, etc.), field sales solutions reporting (e.g., lead capture, timesheet, expense reports, etc.), and field service solutions such as work order dispatches (e.g., HVAC, insurance claims, etc.).

Typically, in more complex forms-based business processes, work requests and form data are initially dispatched to field force workers using a voice channel (e.g., cell phone) or pre-printed paper forms (e.g., clipboard) that is then manually filled out or updated by the mobile worker (e.g., technician). A completed work request might also require one or many subsequent requests (e.g., required parts, required authorization, up-sell opportunities, etc.) that are typically done through a call over a cellular phone, or return trip to the office, or may cause the displacement of the mobile worker. In addition, field inspectors may also capture data in the field using a series of paper forms and binders to complete their inspection tasks, resulting in a slow and inefficient process.

Businesses incur high wireless voice and vehicle fleet costs due to the above-described processes used in dispatching field workers, capturing or updating form data, and completing work orders or inspection forms in the field. Additionally, there are significant costs and inefficiencies with slow, manual processes for the exchange of data using paper-based forms, from the cost of the paper based forms, to duplicate data entry, to errors made in data capture on paper, to waiting for the person with the data to update another person or system, etc.

In order to reduce the use of paper, electronic forms and mobile applications are used in conjunction with mobile devices such as portable computers. More recently, mobile devices are increasingly used for data collection as more and more mobile devices become available (laptops, cell phones, PDAs, tablet PCs, Ultra Mobile PCs, etc.) and as more and more content is available in electronic form (documents, email, pictures, commerce, videos, data etc.), and as access to data services and applications via the devices and content becomes more and more ubiquitous (internet, wireless, etc.). The mobile devices are increasingly used by organizations that have the need to collect data from remote locations which prevent the use of traditional fixed computers.

Mobile device applications are increasingly supporting multiple means of manually and automatically capturing or updating information through different interfaces and methods interacting with data services and applications. The need for securely managing this information and providing a flexible, secure framework for working with online and offline content on a mobile device is critical to improve the productivity and effectiveness of mobile field workers and mobile application solutions. Currently, no workable solution provides a means for a mobile user to make best use of any captured information on a mobile device to be shared by other mobile applications and mobile services, whether being on-line (i.e., a server or web connection) or off-line (on the mobile device itself). At best, the data applications or services may be rewritten to provide data compatibility, but such a process is expensive, time consuming and often unfeasible. Captured data on one mobile device data application or service may be in an incompatible format which prevents integration to data applications and services on the mobile device as well as legacy back-office systems, databases, applications or other hosted data applications and services. Thus, organizations with a mobile workforce who rely on business processes that rely on the timely and secure exchange of data while providing easy to use, flexible, accurate and fast data capture in the field are hampered by the incompatibility of the data format used by different mobile applications.

Therefore, it would be desirable to have a system and method for rapid sharing of data and rapid configuration of required data across different mobile data applications or services. There is a further need to facilitate orchestration of data between mobile data applications or services without reprogramming the applications or services. There is a further need for a mobile data collection system to enable clients to capture or update data from mobile data applications services and share the data with other different mobile data applications and services. There is also a need for a mobile data system which allows data to be communicated and shared with other remote data applications and services.

SUMMARY OF THE INVENTION

According to one example, a method is disclosed of providing a mobile orchestration platform on a mobile device to share data between a first orchestration endpoint managing data in a first data format and a second orchestration endpoint managing data in a second data format. A first endpoint connector associated with the first orchestration endpoint to communicate between the mobile orchestration platform and the first orchestration endpoint is created. A second endpoint connector associated with the second orchestration endpoint to communicate between the mobile orchestration platform and the second orchestration endpoint is created. The mobile orchestration is enabled to translate a data record in an intermediate data format to either or both of the first data format or the second data format.

Another example disclosed is a method for sending data in a first format from a first orchestration endpoint operating on a mobile device to a second orchestration endpoint managing data in a second format. An endpoint connector associated with the second orchestration endpoint, the endpoint connector to establish communication with the second orchestration endpoint is created. A data record in a first format is made available from the first orchestration endpoint. An event to notify an orchestration platform to capture the data record in the first format from the first orchestration endpoint is created. The data record is translated to the second data format. The endpoint connector is used to send the data record from the orchestration platform in the second data format to the second orchestration endpoint.

Another example disclosed is a method of providing a first orchestration endpoint operating on a mobile device capable of managing data in a first format data from a second orchestration endpoint managing data in a second format. An endpoint connector associated with the second orchestration endpoint is created. The endpoint connector establishes communication with the second orchestration endpoint. A data record in the second data format is made available via the second orchestration endpoint. An event is created to notify an orchestration platform to capture the data in the second data format from the second orchestration endpoint. The endpoint connector is used to send the data record in the second data format to the orchestration platform. The data record is translated to the first data format. The data in the first data format is made available to the first orchestration endpoint.

Another example disclosed is a mobile orchestration platform installable on a mobile device for orchestrating data between a first orchestration endpoint managing data in a first data format and a second orchestration endpoint managing data in a second data format. The platform includes a translation module to translate a data record in an intermediate data format to either or both of the first data format or the second data format. A first endpoint connector is associated with the first orchestration endpoint to communicate between the mobile orchestration platform and the first orchestration endpoint. A second endpoint connector is associated with the second orchestration endpoint to communicate between the mobile orchestration platform and the second orchestration endpoint.

Another example disclosed is a system of sharing data for a mobile device. The system includes a first orchestration endpoint managing data in a first data format. A second orchestration endpoint manages data in a second data format. An orchestration platform on the mobile device includes a translation module to translate a data record in an intermediate format to either or both of the first data format or the second data format. A first endpoint connector is associated with the first orchestration endpoint to communicate between the mobile orchestration platform and the first orchestration endpoint. A second endpoint connector is associated with the second orchestration endpoint to communicate between the mobile orchestration platform and the second orchestration endpoint.

Yet another example disclosed is a mobile device allowing the use of data in different formats. The mobile device includes a first orchestration endpoint managing data in a first format. An endpoint connector is in communication with a second orchestration endpoint managing data in a second format. A mobile orchestration platform is in communication with the first orchestration endpoint and the endpoint connector. The mobile orchestration platform allows the translation of a data record between the first and second data formats.

Still another example disclose is an article of manufacture for sharing of data between a first orchestration endpoint managing data in a first format and a second orchestration endpoint managing data in a second format. The article of manufacture includes a computer readable medium for storage on a mobile device. A plurality of instructions is provided wherein at least a portion of said plurality of instructions is storable in the computer readable medium. The plurality of instructions are configured to cause a processor to create a first endpoint connector associated with the first orchestration endpoint to communicate between the mobile orchestration platform and the first orchestration endpoint. The instructions also cause the processor to create a second endpoint connector associated with the second orchestration endpoint to communicate between the mobile orchestration platform and the second orchestration endpoint. The plurality of instructions also case the processor to translate a data record in an intermediate data format to either or both of the first data format or the second data format.

The above summary of the present invention is not intended to represent each embodiment, or every aspect, of the present invention. Additional features and benefits of the present invention are apparent from the detailed description, figures, and claims set forth below.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Figure 1:
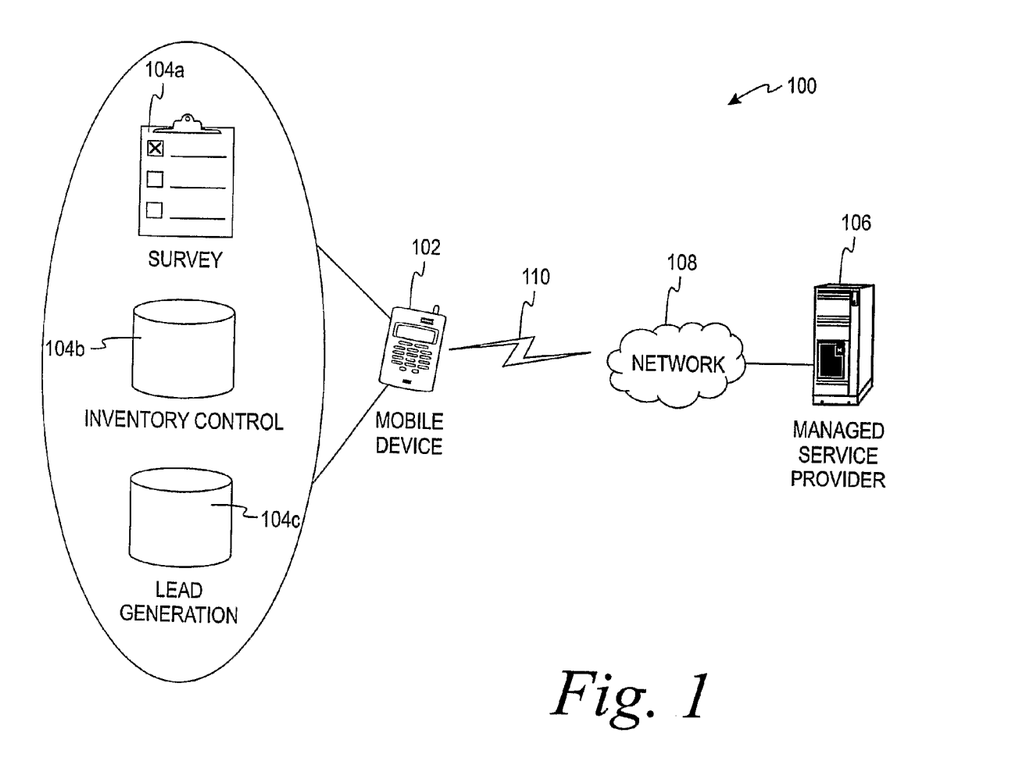
FIG. 1 is an illustration of a mobile data collection system allowing data to be shared between different data applications and services, according to one embodiment of the present invention.

Referring now to FIG. 1, an example system 100 for sharing of data from multiple orchestration endpoints is shown. The term "business process" is used herein to refer to a sequence of events or transitions from one business state to another where the state is characterized by the information captured, context information, and any business process policies and/or rules that govern sharing of data between users or with network services. The term "network service" refers to a service that can provide information capture or that can be a source of information.

As can be seen in FIG. 1, the system 100 includes at least one mobile device 102 having a plurality of mobile applications running or otherwise available thereon. In general, such mobile applications may include any application capable of using one or more forms to automatically and/or manually capture information via the mobile device 102. Examples of such applications may include LeadGenesys from LeadGenesys, Inc. of San Francisco, Calif., Outlook from Microsoft Corp. of Redmond, Wash., and other similar applications. A single instance of data collected by these mobile applications in an electronic form is generally referred to as an "electronic forms data instance" or simply a "data record" or a "data instance." The mobile device 102 in this example is a smart phone, but may be other mobile devices such as a tablet PC, a laptop computer, a cellular telephone, a cradled personal digital assistant (PDA), a wireless PDA and an Ultra Mobile PC. In this example, the applications shown include a survey application 104a, an inventory control application 104b, and a lead generation application 104c. These applications 104a-c typically (but not necessarily) have one or more electronic forms (e.g., a checklist, manifest, contact sheet, etc.) on which information may be captured and stored as an electronic forms data record. The state (e.g., completed?, ready to be sent?, etc.) of the electronic forms data records usually dictate when they are shared or sent to other users or to back-end services available through the managed service provider.

A managed service provider 106 provides the mobile device 102 with the various electronic forms and supporting services and files and, in some instances, the mobile applications corresponding to the electronic forms. The managed service provider 106 typically provides the electronic forms and/or mobile applications to the mobile device 102 over a network 108 (e.g., the Internet) via a suitable wireless connection 110 (e.g., a cellular link).

In this example, the different mobile applications 104a-c which allow user functions such as data collection via the mobile device 102 and access data from other data applications and services. For example, the device 102 in this example may run Outlook for communications and other specialized mobile-form applications. An example of such specialized mobile-form applications such as the mobile applications 104a-c may be developed via the mXDesigner application available from TrueContext of Ottawa, Canada. Of course many other types of mobile-oriented and non-mobile-oriented applications may be created using other applications and be run by the mobile device 102. The mobile device 102 may also allow access to remote applications such as the Salesforce remote data application (available from Salesforce.com of San Francisco, Calif.) via either the network 108 or a web server (not shown) for managing collected data. In this example, the Outlook application may have different data formats than other mobile-form applications installed on the mobile devices 102 and remote data applications and services accessible to the mobile device 102. As will be explained below, a mobile service orchestration platform allows data sharing between different data applications and services on a mobile device such as the mobile device 102, between other mobile devices, and with remote data applications and services. Of course it is to be understood, that these data orchestration processes may be used on multiple devices running multiple data applications and services with multiple data formats.

Figure 2:
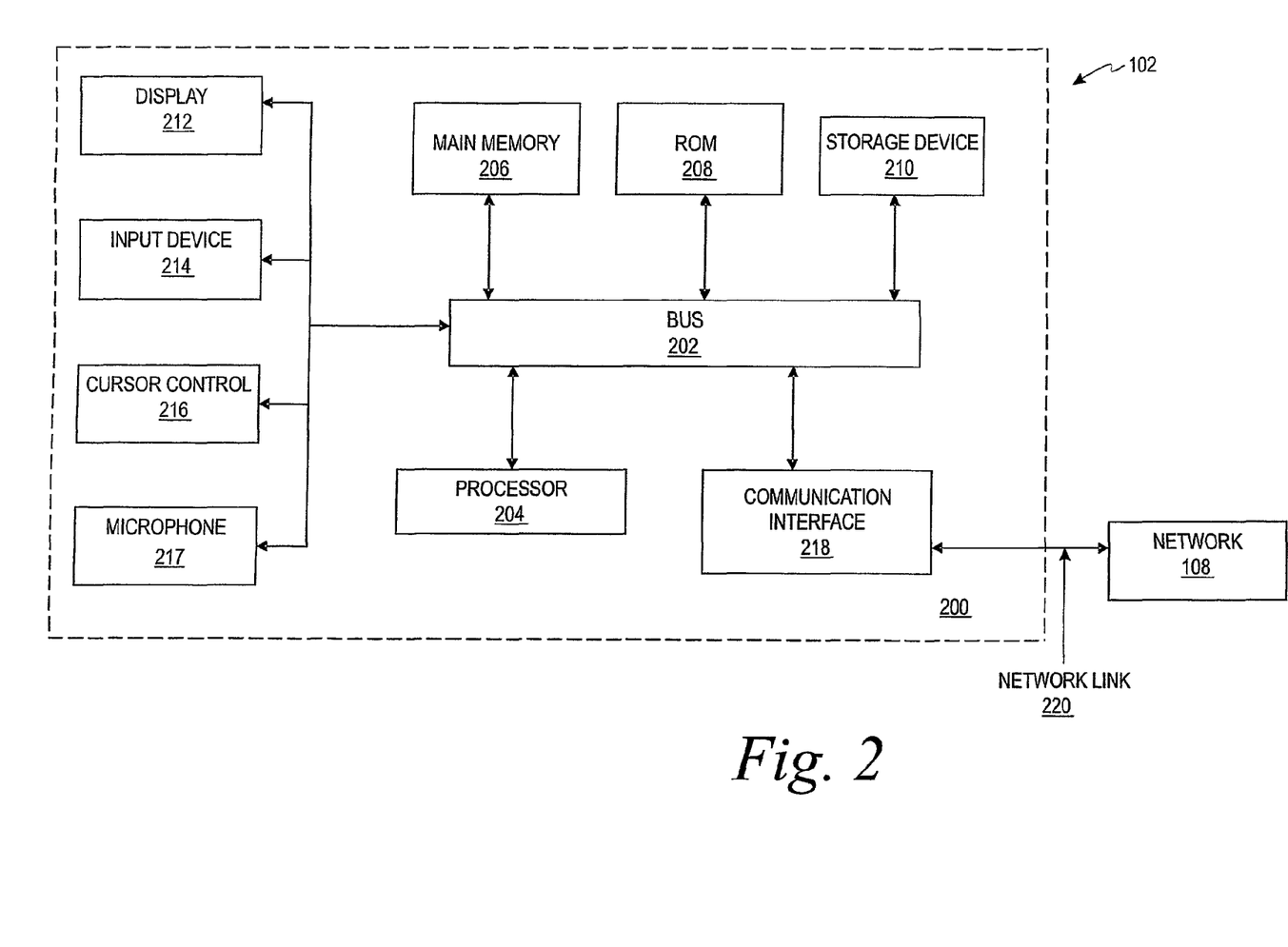
FIG. 2 is a block diagram of the components of the mobile device shown in FIG. 1 which allows sharing of data between mobile data applications and services and other orchestration endpoints.

FIG. 2 shows a block diagram of the components of a control system 200 for a typical mobile device such as the mobile device 102. The control system 200 includes a bus 202 or other communication mechanism for communicating information, and a processor or processors 204 coupled with bus 202 for processing information. The control system 200 also includes a main memory 204, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. The control system 200 further includes a read only memory (ROM) 208 or other static storage device coupled to bus 202 for storing static information and instructions for processor 204. A storage device 210, such as, for example, a flash memory, a magnetic disk or optical disk, is provided and coupled to bus 202 for storing information and instructions.

The control system 200 includes a display 212 coupled to the bus 202. The display 212 may be any suitable display such as a liquid crystal display (LCD), or may be another type of handheld active or passive display, for displaying information to a computer user. An input device 214, including alphanumeric and other keys, is coupled to bus 202 for communicating information and command selections to processor 204. Other user input devices include cursor control 216 or microphone 217. The cursor control 216 may include one or more of any number of devices, such as, for example, a mouse, a trackball, or cursor direction keys for communicating direction information and command selections to processor 204 and for controlling cursor movement on display 212. The cursor control 216 typically has two degrees of freedom in two axes, a first axis (e.g., x) and a second axis (e.g., y), allowing the device to specify positions in a plane.

Execution of sequences of instructions contained in main memory 206 causes processor 204 to perform the process steps described below. One or more processors in a multi-processing arrangement may also be employed to execute the sequences of instructions contained in main memory 206. In alternative embodiments, hard-wired circuitry may be used in place of or in combination with software instructions and it is to be understood that no specific combination of hardware circuitry and software are required. Instructions may be provided in any number of forms such as source code, assembly code, object code, machine language, compressed or encrypted versions of the foregoing, and any and all equivalents thereof. "Computer-readable medium" refers to any medium that participates in providing instructions to processor 204 for execution and "program product" refers to such a computer-readable medium bearing a computer-executable program. The computer usable medium may be referred to as "bearing" the instructions, which encompass all ways in which instructions are associated with a computer usable medium. Computer-readable mediums include, but are not limited to, non-volatile media, volatile media, and transmission media. Non-volatile media include, for example, optical or magnetic disks, such as storage device 210. Volatile media include dynamic memory, such as main memory 206. Transmission media include coaxial cables, copper wire and fiber optics, including the wires that comprise bus 202. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be borne on a magnetic disk of a remote computer. The remote computer can load the instructions into its dynamic memory and send the instructions over a telephone line using a modem. A modem local to the control system 200 can receive the data on a telephone line and use an infrared transmitter to convert the data to an infrared signal. An infrared detector coupled to bus 202 can receive the data carried in the infrared signal and place the data on bus 202. The bus 202 carries the data to main memory 206, from which processor 204 retrieves and executes the instructions. Instructions received by main memory 206 may optionally be stored on storage device 210 either before or after execution by processor 204.

The control system 200 may also include a communication interface 218 coupled to bus 202 to provide a two-way data communication coupling to a network link 220 connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through a network socket to a host computer such as the managed service provider 106 in FIG. 1. Alternatively, the network link 220 may provide a connection to data equipment operated by an Internet Service Provider (ISP). The ISP in turn provides data communication services through the worldwide packet data communication network, now commonly referred to as the "Internet". The network 108 and the Internet both use electrical, electromagnetic or optical signals that carry digital data streams. The signals through the various networks and the signals on network link 220 and through communication interface 218, which carry the digital data to and from the control system 200, are exemplary forms of carrier waves transporting the information. Thus the processing required by method of the invention described by way of example herein may be implemented on a local computer utilizing storage device 210 or may be implemented, for example, on a LAN or over the Internet.

The control system 200 can send messages and receive data, including program code, through the network(s), network link 220, and communication interface 218. In the Internet example, a server might transmit a requested code for an application program through the Internet, the ISP, network and communication interface 218. The received code may be executed by processor 204 as it is received, and/or stored in storage device 210, or other non-volatile storage for later execution. In this manner, the control system 200 may obtain application code in the form of a carrier wave.

Figure 3:
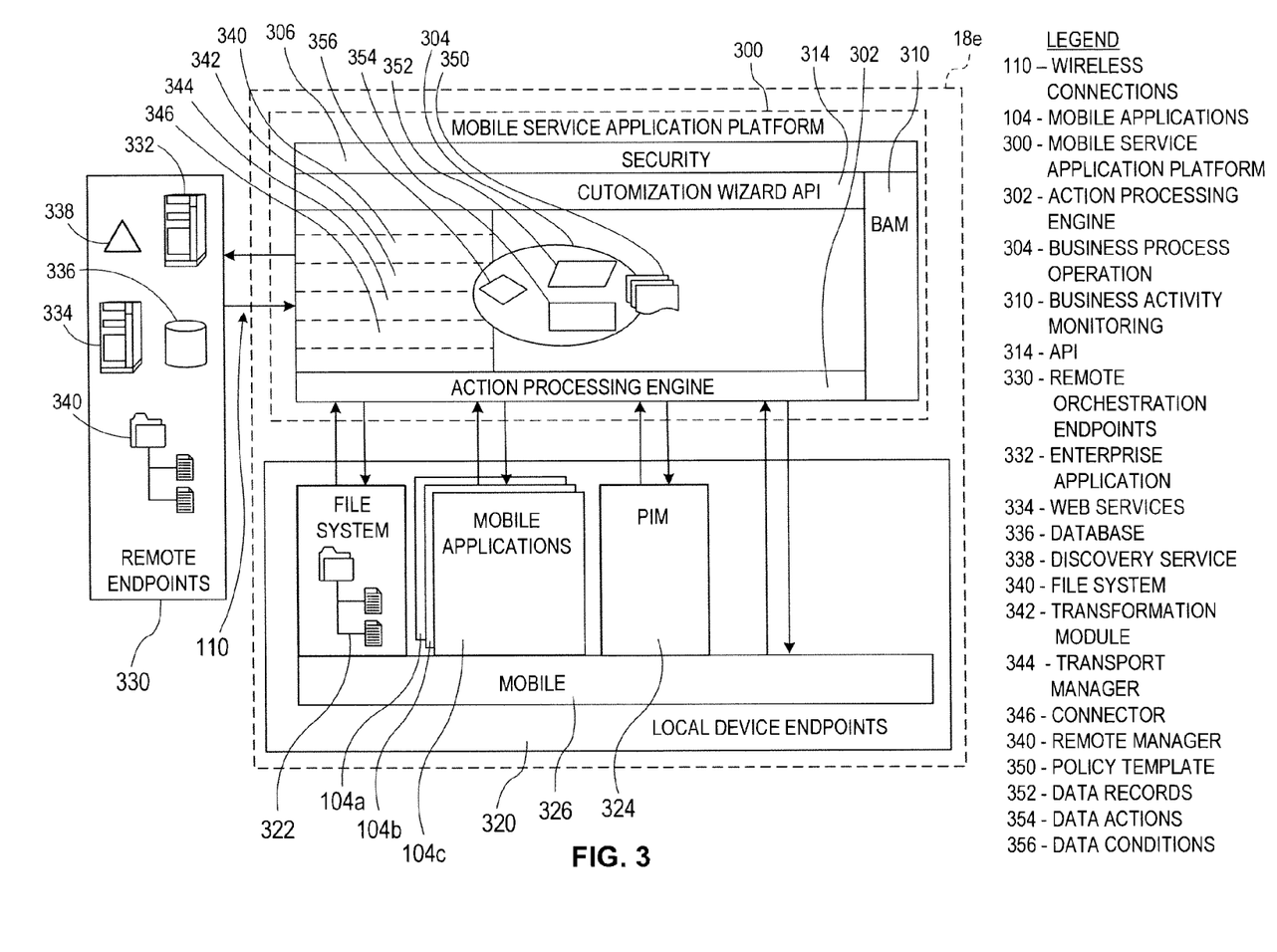
FIG. 3 illustrates a block diagram for a mobile service orchestration platform installed in the mobile device in FIG. 2 which allows orchestration of data between orchestration endpoints such as data applications and data services.

FIG. 3 illustrates a block diagram of a unified mobile service orchestration platform 300 which resides on the mobile device 102. The mobile service orchestration platform 300 provides an interface from a wide variety of mobile devices (using the native file explorer interface of the particular mobile device) for accessing and managing content across distributed, intermittently connected file systems. The mobile service orchestration platform 300 allows users to securely and efficiently move and copy objects between registered file systems.

The mobile service orchestration platform 300 is a native application that runs on the mobile device 102 in FIG. 1. The mobile service orchestration platform 300 contains components written in several different programming languages including C, C++, C#, NET and Java. The mobile service orchestration platform 300 is adapted to run on a variety of different devices including devices running the Microsoft Windows Mobile OS (formerly Pocket PC or PPC), the Symbian OS, the Windows 2000 OS (Win2K, Windows Millenium), the Windows XP OS, the Windows XP tablet OS, the RIM OS, and the Palm OS.

According to one example, the mobile service orchestration platform 300 runs in the native file system of the mobile device 102. Thus, a user is able to utilize the mobile service orchestration platform 300 without any additional training. Further, the mobile service orchestration platform 300 supports the full capabilities of the native file system on the mobile device 102. This provides a "highest common denominator approach" to content management.

The mobile service orchestration platform 300 includes a communication stack module which allows for communication between the mobile service orchestration platform 300 and networks such as the network 108 in FIG. 1 and any other data services. According to one example, the communication stack module allows the mobile service orchestration platform 300 to communicate with the network 108 in the Hypertext Transfer Protocol over Secure Socket Layer (HTTP over SSL) and the Transport Layer Security (TLS) protocol. SSL is an open, nonproprietary protocol that uses a 40-bit key size for the RC4 stream encryption algorithm, which is considered an adequate degree of encryption for commercial exchange. Further, HTTP over SSL supports the use of X.509 digital certificates from the server so that, if necessary, a user can authenticate the sender. Other encryption techniques such as, but not limited to, Advance Encryption Standard (AES) may be utilized. For example, an s-mime technique could also be adopted where the target application is e-mail. Furthermore, the forms designer can specify that the data captured as an XML document on the mobile device 102 may be encrypted using a public or secret-key cryptosystem (e.g., Kerberos, PKI, etc.) to properly secure the content on the mobile device if the device was stolen or lost, or if any of the networked devices or the portal server was compromised.

According to one example, the communication protocol of the system 100 in FIG. 1 utilizes HTTP(S) as the preferred protocol to transport all data files. The system 100 may utilize, as the preferred protocol to distribute and notify other internal or external resources (e.g., users, other machines, etc.), HTTP/HTTPS, SyncML, ActiveSync, SOAP, SMTP, FTP, SMS, SNMP, SMPP, RMI, IIOP, etc. Other communication protocols can be utilized without nullifying the key attributes of the above-described implementation. For example, web extensions such as SOAP and .NET can also be utilized, as well as proprietary communication protocols. A policy-based mobile content engine may also act as an authorizing proxy for each of these protocols that allows the mobile-form applications to communicate in real time with one or more enterprise content sources hosted behind the enterprise firewall. For example, a drop down list in a mobile-form application could be dynamically generated by a SOAP request to an enterprise content source. The mobile content engine would apply appropriate policies both before and after routing the SOAP request from the mobile-form application onto the enterprise content source. As will be explained below, the business orchestration platform obviates the need for specialized programming of the applications to exchange data with the enterprise content sources.

The mobile service orchestration platform 300 also includes encryption libraries which are native device libraries that support encryption. According to one example, the mechanism for encrypting can be SSL and the libraries are native SSL libraries and TLS. The mobile service orchestration platform 300 is extendable by a Configuration User Interface Wizard (CUIW) as will be detailed below. The CUIW provides a mechanism for defining new policy definitions used to capture data from data applications and services and transform the data in a usable format to be used by the local device application.

The mobile service orchestration platform 300 also contains an authentication and authorization module. This authentication and authorization module enables a user of the mobile device 102 to be authenticated and authorized against the network 108 and any data services, and can be extended with communication and user interface components.

The unified mobile service orchestration platform 300 used by any of the local orchestration endpoints (e.g., mobile applications or data services) on the mobile device 102 or remote orchestration endpoints (e.g., data applications or data services) to automate real-time data capture and data sharing between orchestration endpoints on any of the devices which are accessible to the mobile device 102 in FIG. 1. Orchestration endpoints include but are not limited to end-user applications installed on mobile devices (e.g., Personal Information Management (PIM) applications such as Outlook), data capture applications installed on mobile devices associated with peripherals installed or attached to the mobile device (e.g., cameras, audio recorders, bar code scanners, GPS devices), remote enterprise applications accessible via a dedicated network or the Internet and the like (e.g., Customer Relationship Management (CRM) systems, time tracking systems, etc.) as well as data services such as web services, that give access to remote file systems, location based services, maps, or even data management systems and databases.

In this example, the unified mobile service orchestration platform 300 is installed on the storage device 210 of the control system 200 in FIG. 2 for execution by the processor 204 of an example mobile device such as the mobile device 102. The mobile service orchestration platform 300 includes an event and action processing engine 302, a mobile Business Process Orchestration (BPO) engine 304, a services module 306, a secure framework 308, a mobile Business Activity Monitoring (BAM) engine 310, and a mobile customization wizard Application Programming Interface (API) 314.

The mobile service orchestration platform 300 allows the sharing of data in different formats between orchestration endpoints such as local orchestration endpoints 320 installed on the mobile device 102 in FIG. 1. Each local orchestration endpoint has an associated endpoint connector. The local orchestration endpoints 320 include a file system 322, the survey mobile application 104a, the inventory control mobile application 104b, the lead generation mobile application 104c, and a personal information manager (PIM) database 324 managed by Microsoft Outlook. The file system 322, mobile applications 104a-c, and the PIM database 324 are managed by a mobile applications operating system 326 which may also have an associated endpoint connector to share data with the mobile service orchestration platform 300. The mobile applications operating system 326 in this example is a common mobile operating system such as Microsoft Windows Mobile OS (formerly Pocket PC or PPC), Symbian OS, Palm OS, RIM OS, etc. The orchestration endpoints may also include remote orchestration endpoints 330, such as an enterprise application 332, a web service 334, a database 336, a discovery service 338 (to find other remote endpoints) and a file system 340. The endpoint connectors provide communication of data between the associated orchestration endpoint and the mobile orchestration platform 300 without any modification of the local or remote applications or services that receive data from endpoint connectors. The endpoint connectors transform the data into the exact format used by those local or remote applications. In this example, the file system 322, the mobile applications 104a-c, and the PIM database 324 are stored on the storage device 210. Of course it is to be understood that modifications and new data and applications may be received from remote devices via the network 108 or the Internet for storage on the storage device 210.

In this example, the file system 322 may be used to store data which may be collected by the mobile service orchestration platform 300 using hardware or software supported by the mobile device 102. Such data may be stored in text based formats, audio formats, image formats, video formats, etc. In this example, the mobile applications 104a-c as well as the BPO engine 304 provide specialized support for XML based data management using an extensible markup language format but of course other mobile based applications may be used and communicate data via the mobile service orchestration platform 300. In this example, the PIM database 324 contains contact data which may be compiled by all users of a business organization and synchronized with both local data and remote orchestration endpoints such as data managed by remote applications such as the Salesforce application accessible via a web server. The mobile service orchestration platform 300 is capable of capturing data in the native formats from orchestration endpoints such as the file system 322 and the PIM database 324. Data may in turn be requested by each of the local orchestration endpoints (e.g., file system 322, mobile applications 104a-c, and PIM database 324) via policies managed by the mobile service orchestration platform 300. The requested data is sent to the requesting orchestration endpoint in the proper format from the appropriate endpoint connector.

The mobile applications 104a-c used by the mobile device 102, according to this example, are specified in XML-based forms application definition markup language based on the W3C XForms specification to define a rich presentation of forms rendered in a Graphical User Interface (GUI) by the mobile-form application thick or thin-client and the data used by those applications are represented in XML. The application definition markup language may be used by application designers to define application functionality such as the lead generation and survey functions of the example mobile applications 104a-c which are form based. Other functions may include billing, timesheets, weekly expenses, and user surveys. Of course other functions may be incorporated in mobile applications. Further applications may user many other data formats other than XML.

Some enhancements have been made to extend the XForms schema to make it more efficient for mobile-form applications, as well as to support layout of form controls on mobile devices, and integrating routing of forms between users in a mobile-form application. An XML-based policy model is utilized by the mobile-form applications to define application and form states, workflow, validations, conditions, and actions to be processed for the life cycle of a new or updated form data instance. The policy model defines how the form data is managed (e.g., transformation and validation of data, publication of data to targeted resources, publication of data based on the type network connection, notifications and alerts to users based on form actions and events, etc.) and distributed, as well as to whom (people, systems, resources, etc.) it is distributed.

As discussed above, the mobile extensible forms markup language (mXForms) used in the mobile-form applications is based on the XForms W3C recommendation. The mXForms markup language defines how to render rich GUIs online or offline for mobile devices, and display, update and captures data. mXForms and XForms distinctly define the presentation definition (look and feel), the format of the data captured, form controls, and the behavior of the forms-based application (e.g., data validation, navigation, workflow, actions, etc.). The mXForms language can fully leverage the limited display and functionality (including native and external peripherals—e.g., barcode scanner, GPS module, etc.) of some of the targeted mobile devices. Multiple views or mobile forms applications may be required to complete the data capture of a forms-based application, including support for contextual (e.g., dynamic) views or interaction with the form (e.g., Y happens only if the user has selected X in the form). Unique form controls are also needed to display, add, edit, and delete repeating line items on such limited devices. The markup language also affords for creation of unique form controls that future business processes may require. These multiple views and form controls can be used on- or off-line, via thin/thick clients on mobile devices that are OS-enabled.

The event and action processing engine 302 is used to capture data from one or more endpoint connectors. The endpoint connectors are defined for orchestration endpoints including local applications (e.g., mobile applications 104a-c) and data services (e.g., file system 322 or the PIM database 324) as well as remote applications and services for a mobile device such as the mobile device 102. Further endpoint connectors may be defined for remote orchestration endpoints accessible by the mobile device 102 over a network such as via the network 108 or the Internet. The endpoint connectors are registered for any orchestration endpoint that manages data that is minimally compatible with the data managed by the mobile service orchestration platform 300. The event and action processing engine 302 is triggered by an event API to share data or from an orchestration endpoint based on a policy managed by the mobile Business Process Orchestration (BPO) engine 304.

The services module 306 includes the functionality to perform services that integrate the mobile service orchestration platform 300 into the mobile device 102 and in particular facilitate data sharing between orchestration endpoints. The services module 306 includes a remote manager 340, an inline transformation module 342, a transport manager 344 and connectors 346. The connectors 346 are extensible containers that allow each orchestration endpoint (remote or local) integrated with the mobile service orchestration platform 300 to create and plug-in its own connector that defines the actions it supports and the data that it will share. The remote manager 340 tracks the status of communications and connections involving the mobile orchestration platform 300 in order to support the remote endpoint connectors. This may be used to inform the user of the mobile device 102 of failure of connection or communications. The inline transformation module 342 translates data from other orchestration endpoints on the mobile device 102, such as the PIM database 324, or from remote orchestration endpoints, such as the Salesforce application running on a remote server, into the extensible markup intermediate data format used by the BPO engine 304. Some orchestration endpoints like the mobile applications 104a-c may use the same extensible markup format without requiring any transformation. The inline transformation module 342 has access to various translation modules which are specialized to the convert the native data formats of data received from different orchestration endpoints to the extensible markup intermediate data format. Thus, for example, an Outlook format on the mobile device 102 is translated into the extensible markup format using one translation module. Salesforce application data may be translated into the extensible markup format using another translation module. The transport manager 344 manages transfer of data to remote sources and enables communication with remote orchestration clients via communication protocols such as SOAP or HTTP.

The mobile Business Process Orchestration (BPO) engine 304 defines how, when and where to share data with other orchestration endpoints. The BPO engine 304 is provided definitions via a suite of default policy templates 350 relating to organizational business models and processes. A business model or process is the sequence of events or state transitions from one business state to another where the state is characterized by relevant forms data instances, context information and business process policies/rules for sharing data between orchestration endpoints. The default policy templates 330 are used by the BPO engine 304 to define mobile application integration (e.g., connector endpoints) and what data can be captured (e.g., PIM database integration). The BPO engine 304 accesses data records 352, data actions 354 and data conditions 356 which make up the default policy templates 350. In this example, the data records 352 (also known as data instances) are all of the data records managed by the BPO engine 304 and are in a usable extensible markup intermediate data format which in this example is a canonical XML format. In this example, the canonical XML format is also used by the mobile applications 104a-c, but it is to be understood that such applications do not have to manage data in a format that is identical to that of the BPO engine 304. The data actions 354 are different operations which the BPO engine 304 may perform with the data such as translations or capture and transmission via calls to endpoint connectors. The data conditions 356 are requirements which are the attributes of the data records or the state of the data records. For example, a data condition may apply conditional logic to the sharing of a data record between different endpoint connectors.

In this example, the BPO engine 304 includes policy templates to invoke data capture from the PIM database 324 for different functions performed by orchestration endpoints such as the mobile applications 104a-c. For example, one of the mobile applications 104a-c may have a drop down menu which includes contact data. In order to obtain the contact data, the mobile application initiates an event to the event and action processing engine 302. The event triggers a policy template to obtain the contact data from another orchestration endpoint via its associated endpoint connector (in this example, the policy template has been instantiated specifically for the Microsoft Outlook application which manages the PIM database 324) and supply it to the requesting mobile application. This policy template then invokes the action to access the contact data of the PIM database 324 via an API call. The BPO engine 304 then converts the contact data from the PIM database 324 into contact data in the canonical XML format via the services module 306 and sends the data to the requesting mobile application. Alternatively, another policy could be defined to invoke the action to obtain the contact data from a remote orchestration endpoint via its associated endpoint connector such as the Salesforce contact management application accessible via a web server. In such a case, the BPO engine 304 invokes the action on the endpoint connector to achieve communication with the remote orchestration endpoint. In another example, a policy may direct the BPO engine 304 to convert a data record from the canonical XML format to send the converted data record such as a new contact data record from the mobile application 104c to another orchestration endpoint via its associated endpoint connector such as the PIM database 324. In this example, such a policy would require the action of translating the data from the canonical XML format to the Outlook data format.

The secure framework 308 allows enterprise administrators to control what data may be captured and how it may be shared with mobile applications and mobile services. The secure framework 308 also ensures that the data securely flows from its orchestration endpoint source to an authorized destination orchestration endpoint.

The mobile Business Activity Monitoring (BAM) engine 310 provides real-time metrics gathering on activities processed from the different endpoint connectors. The BAM engine 310 keeps a log file in order to provide orchestration platform performance data. Such data may be used to analyze the effectiveness, use etc. of devices or other metrics of the organization. For example, such data may include statistics for network availability, access to PIM databases, use of mobile applications, etc. This is useful for analyzing device specific performance by either the mobile device or a central server coupled to many mobile devices for analyzing overall system performance.

The mobile customization wizard API 314 is used to manage, customize, clone and create policies for the BPO 304. As noted above, the suite of policy definitions 330 includes default policies. The mobile customization wizard API 314 allows a user to modify or create other policies for using the BPO 304 via an interface which may be displayed by the mobile device 102 on the display 212.

Figure 4A:
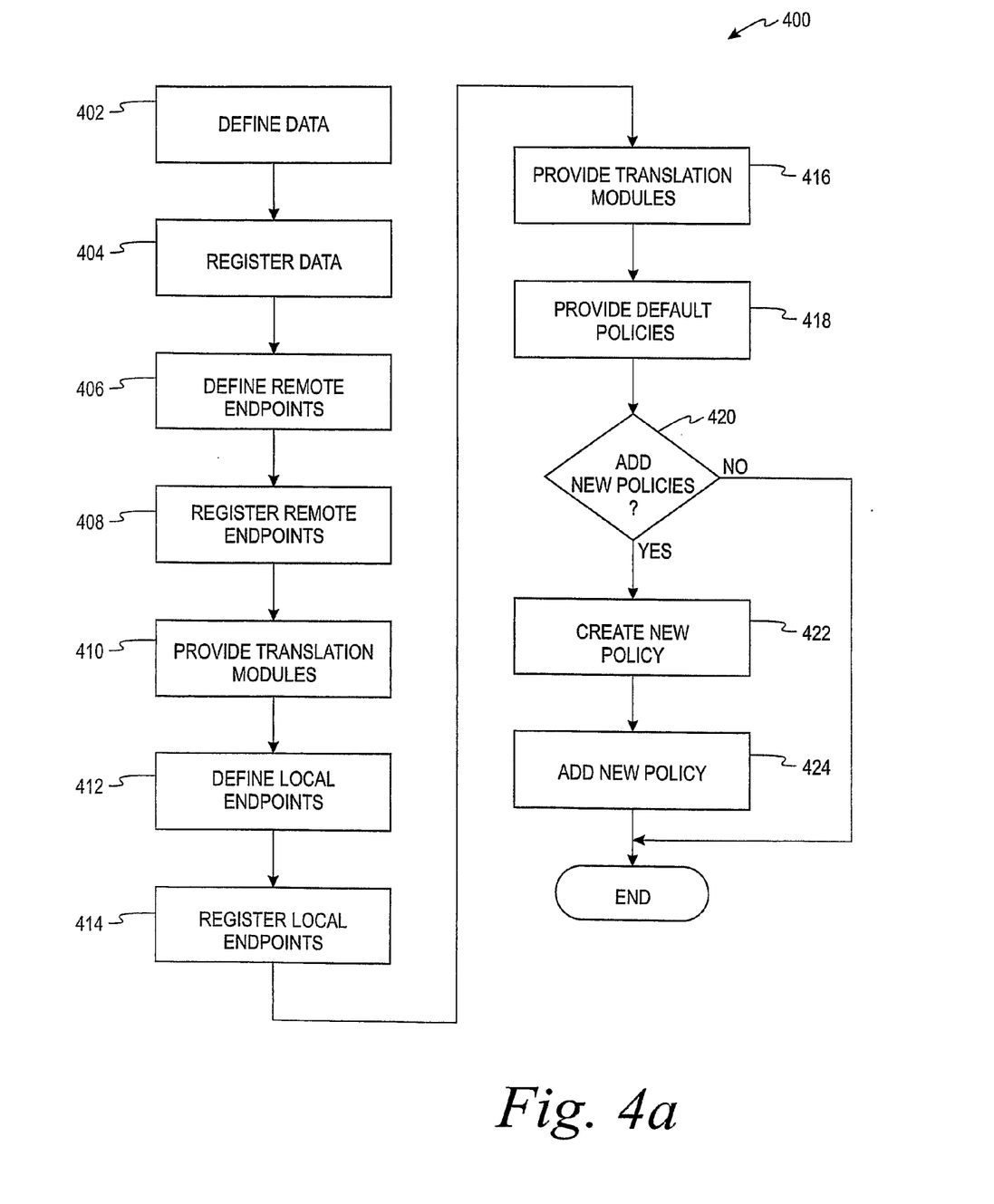
FIGS. 4A-C illustrate flow diagrams of processes for sharing data between orchestration endpoints using the mobile service orchestration platform of FIG. 3.

FIG. 4A is a flow chart 400 representative of example machine readable instructions for implementing the processes managed by the mobile service orchestration platform 300 of FIG. 3. In this example, the machine readable instructions comprise an algorithm for execution by: (a) a processor, (b) a controller, and/or (c) any other suitable processing device. The algorithm may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it maybe implemented by an application specific integrated circuit (ASIC), a programmable logic device (PLD), a field programmable logic device (FPLD), discrete logic, etc.). For example, any or all of the event and action processing engine 302, mobile Business Process Orchestration (BPO) engine 304, services module 306, secure framework 308, mobile Business Activity Monitoring (BAM) engine 310, and mobile customization wizard API 314 could be implemented by software, hardware, and/or firmware. Also, some or all of the machine readable instructions represented by the flowchart of FIG. 4A may be implemented manually. Further, although the example algorithm is described with reference to the flowchart illustrated in FIG. 4A, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The process in FIG. 4A is used to initialize the BPO engine 304 in FIG. 3 for use in the example mobile device 102 in FIG. 3. The data formats are first defined to represent the types of data records in the mobile applications and any other orchestration endpoints in potential communication with the mobile orchestration platform 300 in step 402. In this example, the data type is generally defined by the extensible markup format used by the BPO engine 304 (canonical XML format). The types of data records are registered with the event and action processing engine 302 in step 404.

The process then defines remote endpoint connectors to remote orchestration endpoints in step 406. Example remote orchestration endpoints may include, but are not limited to, a remote customer relationship management (CRM) application on a remote server such as Microsoft CRM or a customer data management application such as Salesforce.com available via a web-based server. The remote endpoint connectors are registered with the services module 306 in step 408. The services module 306 is provided with the necessary translation modules to translate the data formats of the remote orchestration endpoints to the extensible markup format used by the BPO engine 304 if needed in step 410.

The process then defines local endpoint connectors to local orchestration endpoints such as the mobile applications 104a-c or the PIM database 324 on the mobile device 102 in step 412. The local endpoint connectors are registered with the services module 306 in step 414. The services module 306 is provided with the necessary translation modules to translate data formats used by the local orchestration endpoints to the extensible markup format used by the BPO engine 304, if needed, in step 416. The default policies are them provided to the BPO engine 304 in step 418.

The user may be offered an option to add new policies in step 420. If no new policies are added, the initialization of the mobile service orchestration platform 300 is completed. If a new policy is desired, the process allows the creation of new policies via the mobile customization wizard API 314 in step 422. The new policy is then added to the BPO engine 304 in step 424 and the initialization is completed.

Figures 4B, 4C:
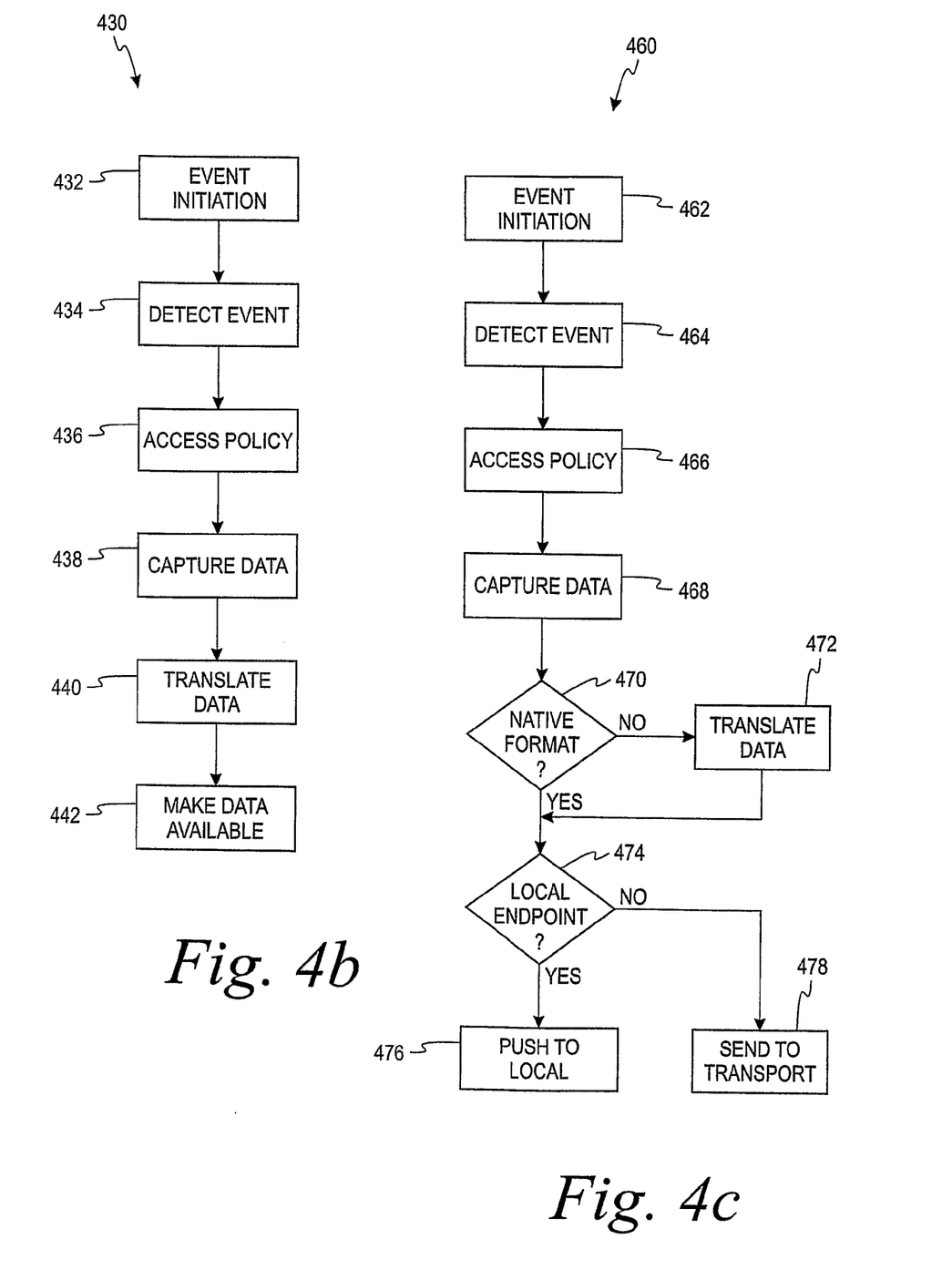

FIG. 4B is a flow diagram 430 of an example process followed by the BPO engine 304 when an orchestration endpoint requests a data record that will be provided by some other orchestration endpoint according to a BPO engine policy. In step 432, an orchestration endpoint such as the mobile application 104c in FIG. 3 initiates an event. The event may be, for example, requesting a contact data record from the mobile service orchestration platform 300. In step 434, the event and action processing engine 302 detects the event and informs the BPO engine 304. The BPO engine 304 access the applicable policy which may be a default policy or a user created policy in step 436. In this example, the policy directs the BPO engine 304 to capture the needed data record via the endpoint connectors defined by the policy in step 438. If the endpoint connector is associated with a remote orchestration endpoint, the data record is obtained via the services module 306 in step 438. The services module 306 also performs the necessary data translations of captured data records to the extensible markup format used by the BPO engine 304 in step 440. The data conversion in step 440 may be unnecessary if the requested data record is already in the extensible markup format. The data record is then made available to the requesting mobile application via the event and action processing engine 302 in step 442.

FIG. 4C is a flow diagram 460 of an example process followed by the BPO engine 304 when an orchestration endpoint such as the mobile application 104c provides data that will be shared with some other orchestration endpoint or endpoints via the mobile service orchestration platform 300. In step 462, an orchestration endpoint such as the mobile application 104c in FIG. 3 initiates an event. The event may be, for example, sending a newly obtained contact data record to another orchestration endpoint or endpoints. In step 464, the event and action processing engine 302 detects the event and informs the BPO engine 304. The BPO engine 304 accesses the applicable policy which may be a default policy or a user created policy in step 466. In this example, the policy directs the BPO engine 304 to obtain the needed data from the mobile application 104c via the event and action processing engine 302 in step 468. As explained above, the data used by the mobile application is in the extensible markup format used by the BPO engine 304 so no translation is necessary. The policy defines whether the data needs to be translated into another data format for the destination orchestration endpoint in step 470. If not translation is necessary, the BPO engine 304 proceeds to step 474. If a translation is necessary, the services module 306 performs the necessary data translation of the data record to the native data format used by the destination orchestration endpoint in step 472. The BPO engine 304 then determines whether the destination orchestration endpoint is remote or local in step 474. If the destination source is local, the data is pushed to the proper endpoint connector according to the policy by the event and action processing engine 302 in step 476. If the destination source is remote, the data record is sent by using the transport module 344 of the services module 306 in step 478.

Figure 5:
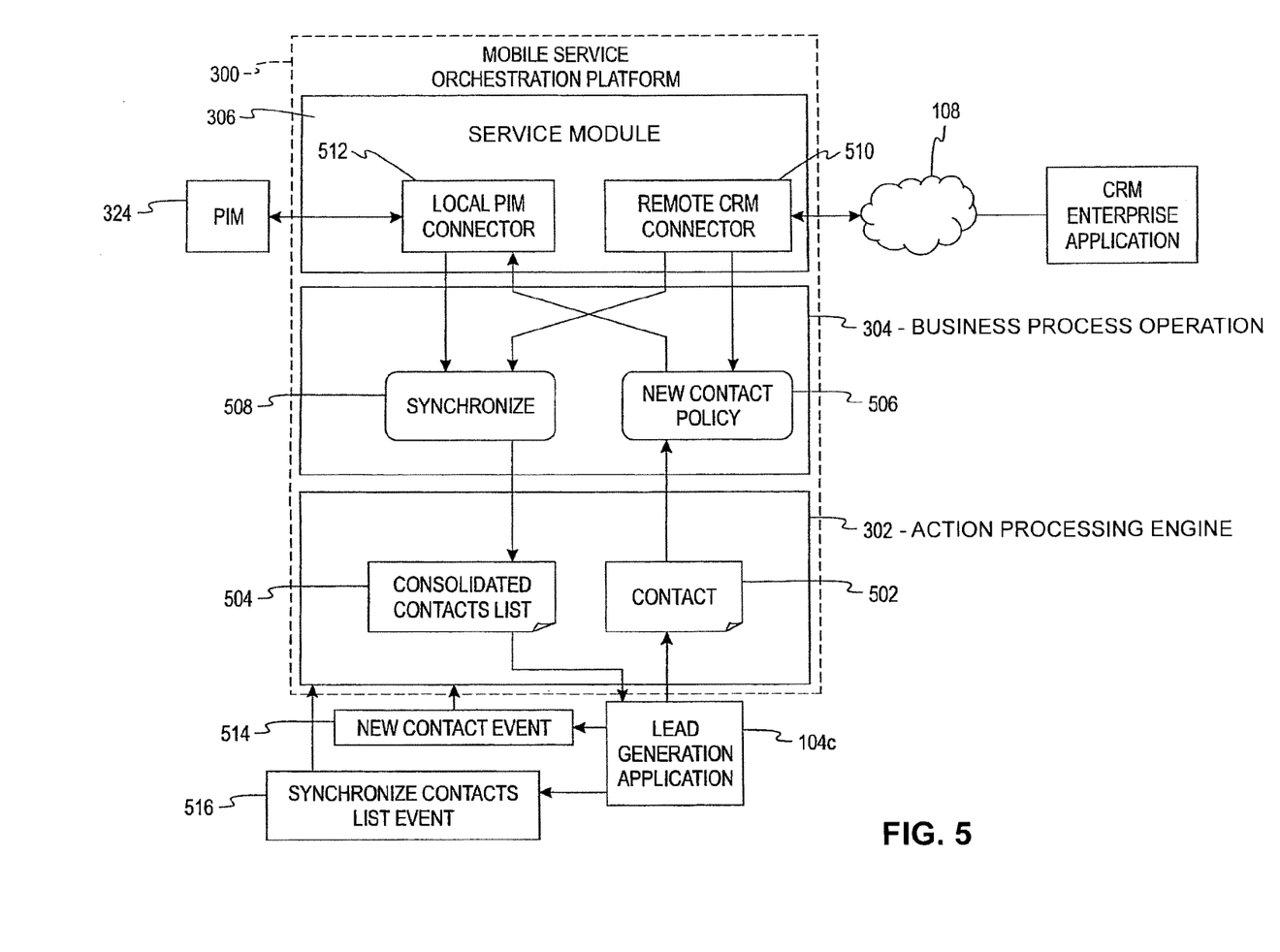
FIG. 5 illustrates a block diagram of the components of the mobile service orchestration platform in FIG. 3 used in the process of sharing data between orchestration endpoints.

FIG. 5 is a diagram 500 of the movement of data over the mobile service orchestration platform 300 and between orchestration endpoints for several different policies to facilitate data orchestration involving the mobile application 104c in FIG. 3. This example uses events initiated by the lead generation mobile application 104c installed on the mobile device 102 in FIG. 3. A "contact" data record type 502 and a "consolidated contacts list" data record type 504 have been defined and registered. A "new contact" policy 506 has been created using the mobile orchestration wizard API 314 which allows data records created by the mobile application 104c to be made available to other orchestration endpoints. A "synchronize contacts" policy 508 has also been created to synchronize contact list data records between other orchestration endpoints and the mobile application 104c.

A remote endpoint connector 510 has been defined and registered for a CRM (customer relationship management) enterprise application accessible via the network 108 in FIG. 1. The remote endpoint connector 510 allows access to a back-end Microsoft CRM application running on a server using the MS-CRM data format. The endpoint connector 510 is a plug-in to the connectors 346 in the services module 306 that uses the in-line transformation module 342 to convert between the MS-CRM data format and the extensible markup format used by the BPO engine 304. It also provides actions that can be triggered by the BPO engine 304 to create a new contact or return a list of contacts.

A local endpoint connector 512 has been defined and registered for the PIM database 324 managed by Microsoft Outlook in this example. The local endpoint connector 512 is a plug-in to the connectors 346 in the services module 306 that uses the in-line transformation module 342 to convert between the Outlook data format and the extensible markup format used by the BPO engine 304. It also provides actions that can be triggered by the BPO engine 304 to create a new contact or return a list of contacts.

The "new contact" policy 506 pushes a new contacts record into the local PIM database 324 via the local PIM endpoint connector 512 and to the remote CRM enterprise application via the remote endpoint connector 514 whenever a "new contact event" 514 is generated by the lead generation application 104c. The "synchronize contacts list" policy 508 provides an up to date consolidated list of contact data record from both the local PIM database 324 via the endpoint connector 512 and the remote CRM enterprise application via the endpoint connector 510 whenever a "synchronize contacts list" event 516 is triggered by the lead generation application 104c. Such an event may be triggered on a scheduled basis or an as needed basis from the lead generation mobile application 104c. Alternatively, orchestration endpoints such as the PIM database 324 and/or the CRM enterprise 332 application may generate the event as a notification when their respective contact lists are updated. It is to be understood that the various data record types 502 and 504, policies 506 and 508 and endpoint connectors 510 and 512 are simply illustrative examples and many additional data record types, policies and endpoint connectors could be used by the mobile service orchestration platform 300.

The user opens the lead generation mobile application 104c on the mobile device 102 in FIG. 3. The lead generation mobile application 104c includes a user interface which is rendered on the display 212 in FIG. 2. The user interface may include various controls which allow the user to perform different lead generation functions including a "list of existing contacts button." Selecting this button triggers the "synchronize contacts list" event 516 in the event and action processing engine 302 and the up to date consolidated list of contacts data record is assembled by the BPO engine 304 following the "synchronize contacts list" policy 504. The policy 504 obtains data from both the local PIM endpoint connector 512 and the remote CRM enterprise application endpoint connector 514. The consolidated contacts data record is converted via the services module 306 to the canonical XML format and displayed in the interface generated by the lead generation mobile application 104c.

A user may also create a new contact record which may be made available to different orchestration endpoints on the mobile device and remotely via the mobile service orchestration platform 300. For example, a "create new contact" function may be requested by a user if the user could not find a contact in the contact list in the lead generation mobile application 104c. The lead generation mobile application 104c includes a control to allow a user to create a new contact via data entry from the mobile device 102. When the new contact data is saved to create a new contact data record, the "new contact" event 516 is triggered in the event and action processing engine 302. The new contact record is a "contact" data record type 502 and is pushed by the BPO engine 304 according to the "new contact" policy 506 to the local PIM endpoint connector 512 and the Remote CRM enterprise application endpoint connector 514. The new contact data is transformed via the services module 306 to the Outlook and CRM formats and is made available in the respective data formats to the PIM database 324 and the CRM enterprise application 332.

This application incorporates by reference, in its entirety, the following U.S. Patent Applications: "Mobile Core Client Architecture," by Marc Chéné, Liam Peyton, Kevin McGuire, and Brant Drummond, "Method And System For Customizing A Mobile Application Using A Web-Based Interface," by Mitch A. Brisebois, Brant Drummond, Arjun Mehta, Marc Chéné, and Mark Flannigan, and "Real Time Records And Dashboards From Aggregated Mobile Data," by Mitch A. Brisebois, Arjun Mehta, Kevin McGuire, and Cyril Soga, each of which is being filed concurrently herewith on Jan. 12, 2007. Each of the aforementioned U.S. patent applications are assigned to or under obligation of assignment to TrueContext Corp. of Ottawa, Canada.

This application expressly incorporates herein by reference, in its entirety, U.S. Published Patent Application Nos. US2006161646, entitled "Policy-Driven Mobile Forms Applications," published Jul. 20, 2006, US20060080397, entitled "Content Management Across Shared, Mobile File Systems," published Apr. 13, 2006, and 20060089938, titled "Distributed Scalable Policy Based Content Management," published on Apr. 27, 2006, each of which are assigned to TrueContext Corp. of Ottawa, Canada. This application also expressly incorporates herein by reference, in its entirety, International Publication No. WO 2004/013782 A1, titled "Contextual Computing System," published on Feb. 12, 2004, which is assigned to TrueContext Corp. of Ottawa, Canada.

While the presently disclosed concepts have been described with reference to one or more particular embodiments, those skilled in the art will recognize that many changes may be made thereto without departing from the spirit and scope of the presently disclosed concepts. Any combination and/or sub-combination of the examples, embodiments, aspects, claims, methods, acts, processes, claim elements, or components disclosed herein, however termed, are expressly contemplated as falling within the present concepts. For example, although various aspects of the present concepts are set forth in the appended claims, wherein the dependent claims relate back to selected preceding claims, including the independent claim, it is to be understood that each of the dependent claims may properly depend from any of the preceding claims, to the extent not logically excluded, in accord with aspects of the present concepts. Thus, for example, the present concepts expressly include every possible combination of dependent claims with their respective independent claim, regardless of stated dependency. Further, the presently disclosed concepts are considered to include, without limitation, any combination and/or sub-combination of the disclosed examples, embodiments, aspects, claims, methods, acts, processes, claim elements, or components disclosed herein with the examples, embodiments, aspects, claims, methods, acts, processes, claim elements, or components disclosed in the references and applications incorporated by reference herein.

What is claimed is:

1. A method of communicating data between applications being accessed by a mobile device, said method comprising:
   receiving a data record by a source application being executed by a processor on said mobile device, said source application being associated with a source endpoint, said data record being in a source data format;
   detecting the reception of said data record by an event processing engine being executed on said mobile device, said event processing engine initiating the execution of a policy; and
   triggered by said policy, an orchestration engine:
      identifying a destination application for said data record based on said policy and said data record, said destination application being associated with a destination endpoint, said destination application supporting a destination data format;
      instructing a services module to access said data record through said source endpoint, said service module being executed on said mobile device;
      translating said data record from said source data format to an intermediate data format;
      translating said data record in said intermediate data format into a destination data format by instructing said services module to access said data record in said destination data format through a destination endpoint; and
      transmitting said data record in said destination data format to said destination application.

2. The method of claim 1 further comprising creating, reading, updating and deleting said policy through an Application Programming Interface.

3. The method of claim 1 wherein said destination application is executed by a processor on said mobile device.

4. The method of claim 1 wherein said destination application is executed on a remote device and transmitting said data record is done over a network.

5. The method of claim 1 wherein said source application stores said data record in said source data format in a source private memory, said source private memory being only accessible by said source application.

6. The method of claim 1 wherein said services module stores said data record in said intermediate data format in an intermediate private memory, said intermediate private memory only accessible by said services module.

7. A method of communicating data between applications being accessed by a mobile device, said method comprising:
   receiving a data record by a source application being executed by a processor on a remote device, said source application being associated with a source endpoint, said data record being in a source data format;
   detecting the reception of said data record by an event processing engine being executed on said mobile device, said event processing engine initiating the execution of a policy; and
   triggered by said policy, an orchestration engine on said mobile device:
      identifying a destination application for said data record based on said policy and said data record, said destination application being associated with a destination endpoint, said destination application supporting a destination data format;
      instructing a services module to access said data record through said source endpoint, said service module being executed on said mobile device;
      translating said data record from said source data format to an intermediate data format;
      translating said data record in said intermediate data format into a destination data format, said orchestration engine instructing said services module to access said data record in said destination data format through a destination endpoint; and
      transmitting said data record in said destination data format to said destination application.

* * * * *